United States Patent [19]

Reiter

[11] Patent Number: 5,642,503

[45] Date of Patent: Jun. 24, 1997

[54] METHOD AND COMPUTER SYSTEM FOR IMPLEMENTING CONCURRENT ACCESSES OF A DATABASE RECORD BY MULTIPLE USERS

[75] Inventor: Allen Reiter, Haifa, Israel

[73] Assignee: Microsoft Corporation, Redmond, Wash.

[21] Appl. No.: 168,808

[22] Filed: Dec. 15, 1993

[51] Int. Cl.$^6$ ................................................ G06F 17/30
[52] U.S. Cl. ................... 395/608; 395/619; 364/DIG. 1
[58] Field of Search ................................ 395/600, 575, 395/608, 619

[56] References Cited

U.S. PATENT DOCUMENTS

| | | | |
|---|---|---|---|
| 5,151,988 | 9/1992 | Yamagishi | 395/600 |
| 5,170,480 | 12/1992 | Mohan et al. | 395/600 |
| 5,280,612 | 1/1994 | Lorie et al. | 395/600 |
| 5,369,757 | 11/1994 | Spiro et al. | 395/575 |
| 5,404,502 | 4/1995 | Warner et al. | 395/575 |
| 5,410,697 | 4/1995 | Baird et al. | 395/650 |
| 5,414,840 | 5/1995 | Rengarajan et al. | 395/600 |

*Primary Examiner*—Thomas G. Black
*Assistant Examiner*—John C. Loomis
*Attorney, Agent, or Firm*—Seed and Berry LLP

[57] ABSTRACT

A method and computer system for implementing concurrent edits of a database record by a plurality of users is provided. The preferred embodiment allocates a fixed mount of storage space in the computer system's main memory for each of the plurality of users. The fixed amount of storage space is for storing versions of the record created as a result of the user modifying the record. In response to an access request for the record by one of the plurality of users, the preferred embodiment determines whether the user should be given access to the record itself or to one of the versions of the record, if any exist. When the user modifies the record to create a version of the record, the preferred embodiment stores the version of the record within the fixed amount of storage space allocated to the user.

9 Claims, 12 Drawing Sheets

METHOD AND COMPUTER SYSTEM FOR IMPLEMENTING CONCURRENT ACCESSES OF A DATABASE RECORD BY MULTIPLE USERS

TECHNICAL FIELD

This invention relates generally to file management, and more particularly, to the management of database records that are accessible to multiple users.

BACKGROUND OF THE INVENTION

A database is a collection of related records stored on a computer system. Often times, these records are accessible to multiple users (both people and computer programs) at the same time. A data integrity problem occurs when multiple users are concurrently attempting to access or modify a particular database record. If a database report is run while users are executing update transactions on records in the database, then the update transactions may cause the data to change, resulting in inconsistencies in the database report. For example, if database records are used to represent accounts at a bank and a user has multiple accounts at the bank, when the user transfers funds from one account to another account, a subtraction of funds from one record and an addition of funds to the other record must occur. If the bank is running an account balance report at the same time the user is transferring funds, and the report reads one record before the subtraction occurs and the other record after the addition occurs, then the user's total account value will be wrong.

There are several prior art solutions to this problem. One solution is to simply lock the database and not allow any updates while the report is being generated. This solution is inadequate because it limits the accessibility of the records in the database. Another prior art solution is to record the start time of the report and the time of each record's last update. If the report encounters a record with an update time that is after the start time of the report, then the report aborts and starts over. This solution is undesirable because it restricts reports to being generated when there is no activity in the database. Yet another solution maintains versions of records. A version is a copy of a record made immediately before the start of a modification of that record. Versions of records are maintained in case the record itself is inaccessible for some reason (e.g., someone is currently editing the record). Thus, a report may run to completion because the report may access a version instead of the record. One disadvantage of this solution is that all of the versions for a record are stored with the database record. Because the number of versions a particular record may have is unbounded, the database may become too large and cause performance of the database to suffer.

SUMMARY OF THE INVENTION

A preferred embodiment of the present invention provides a computer system for managing records accessible to a plurality of entities. The computer system includes a main memory, a secondary memory, and a central processing unit. The records are stored in the secondary memory and versions of the record are stored in the main memory. In the preferred embodiment, the main memory is logically subdivided into a plurality of fixed size storage blocks such that one storage block is allocated for each of the plurality of entities so that versions created by an entity are stored together in the storage block allocated to the entity. Each record stored in the secondary memory includes a version indicator for indicating whether versions of the record are stored in the main memory. The database server determines in response to an access request for one of the records by one of the plurality of entities whether the entity should have access to the record as stored in the secondary memory or to a version of the record as stored in the main memory.

In the preferred embodiment, each version stored in the main memory includes an address field for storing the location in the secondary storage of the record for which the version was created, an entity identification field for storing an identifier of the entity that created the version, a commit time field for storing when the version was committed, a forward link field for storing a location in the main memory of a next version that has the same value in the address field as the version, a backward link field for storing a location in the main memory of a previous version that has the same value in the address filed as the version, and a data field for storing a copy of the record.

DETAILED DESCRIPTION OF THE INVENTION

A preferred embodiment of the present invention provides a method and computer system for implementing concurrent accesses to a database record by multiple users. Either a person or a computer program may be considered a user. In the preferred embodiment, versions of a record are maintained apart from the database on a per user basis. In other words, all versions created by a particular user are grouped together, rather than all versions for a particular record being grouped together. Each version contains, among other things, a "before" image of a record. The before image is a copy of the record before the start of a modification transaction.

Figure 1:
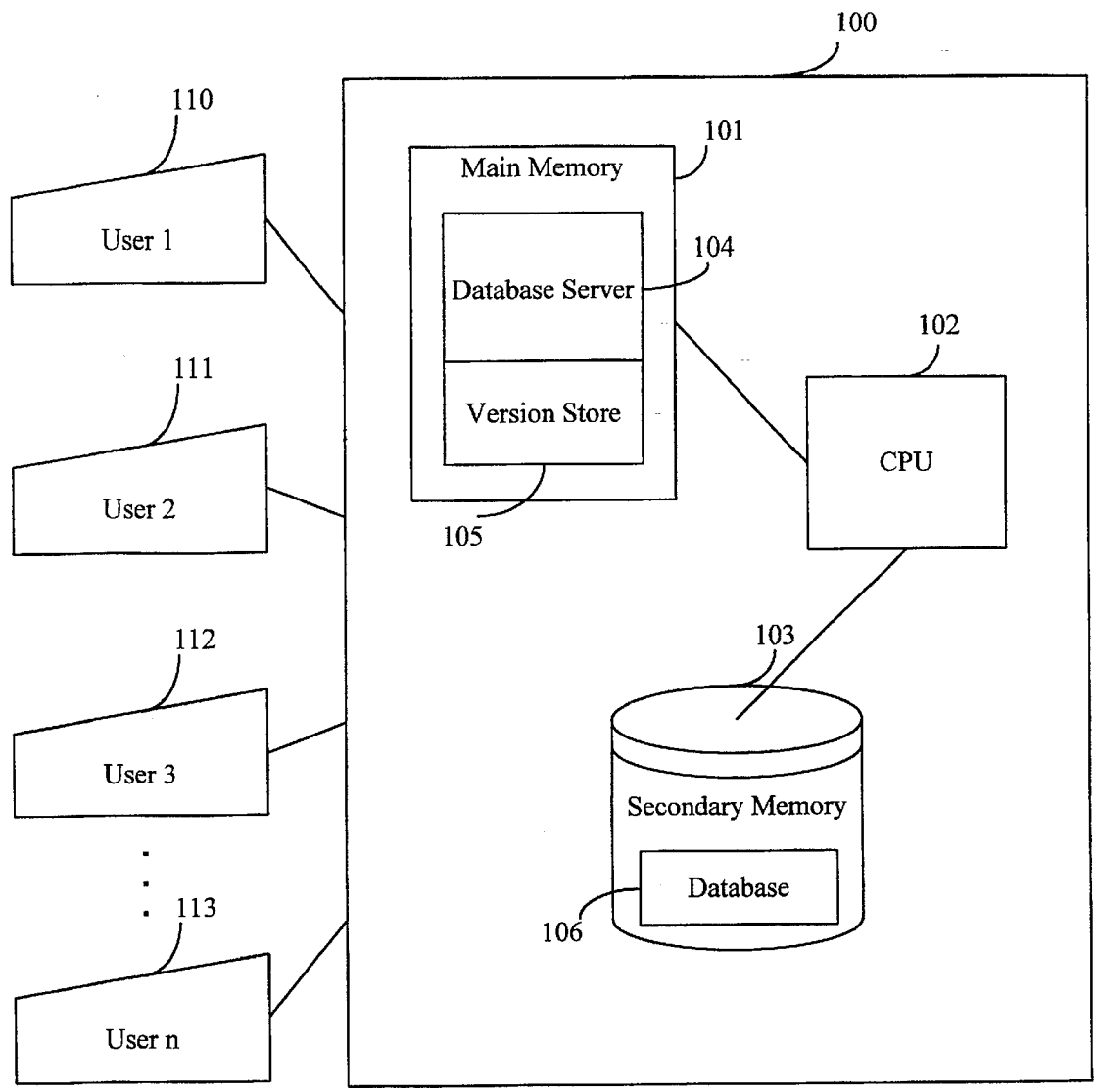
FIG. 1 is a block diagram of a computer system for practicing the preferred embodiment of the present invention, including a main memory, a central processing unit, and a secondary memory, the secondary memory storing a database server, and the main memory storing a version store and a database.

FIG. 1 is a block diagram of a computer system 100 for practicing the preferred embodiment of the present invention. This computer system 100 is merely illustrative and should not be viewed as restricting the present invention. Those skilled in the art will know other suitable computer system configurations for practicing the present invention. The computer system 100 comprises a main memory 101, a central processing unit (CPU) 102, and a secondary memory 103 such as a disk storage system. A database server 104 and a version store 105 reside in the main memory 101. A plurality of users 110, 111, 112, and 113 interact with the computer system 100. A database 106 is stored in the secondary memory 103. Records in the database 106 are typically stored as nodes on a page. When access to a particular record is needed, a common optimization is to transfer an entire page of records to the main memory 101.

Figure 2:
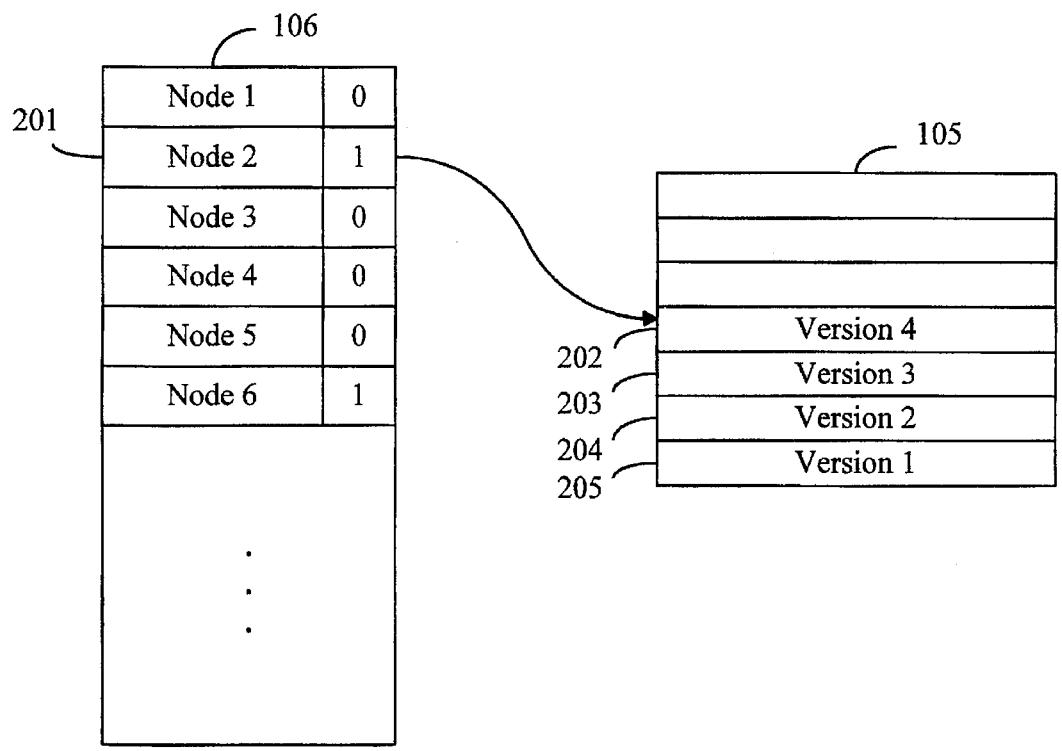
FIG. 2 is a block diagram of the database and the version store of FIG. 1 in accordance with the preferred embodiment of the present invention.

FIG. 2 is a block diagram of the database 106 and a portion of the version store 105. As mentioned previously, records in the database 106 are stored as nodes in the secondary memory 103 (FIG. 1). A bit in the data structure of each node alerts the database server 104 (FIG. 1) to the possible existence of different versions. The version store 105 keeps track of versions of a record. The version store 105 may be considered a stack-like structure in which versions are added to the top of the stack. For example, the node 201 has a first version 202, a second version 203, a third version 204, and a fourth version 205 stored in the version store 105.

There are essentially two kinds of entries in the version store 105: committed and uncommitted. Committed entries represent a version of data which has been changed in the database. The version is temporarily maintained in the version store 105 in case an existing transaction needs to look at it. An existing transaction is one that began before the data was updated. Committed entries are eventually discarded by a clean-up process. The clean-up process used by the preferred embodiment of the present invention is described below in more detail with reference to FIGS. 11A–11B.

Uncommitted entries represent data that is in the process of being changed. Because the entries have not yet been committed, they form in effect an "undo" log. If a user aborts a modification transaction, the uncommitted entry may be copied back to the database. When an uncommitted entry exists for a particular user, that user sees the data as it exists in the database, but all other users see entries stored in the version store. Data in an entry in the version store may not be modified; only data in a record in the database may be modified.

Figure 3:
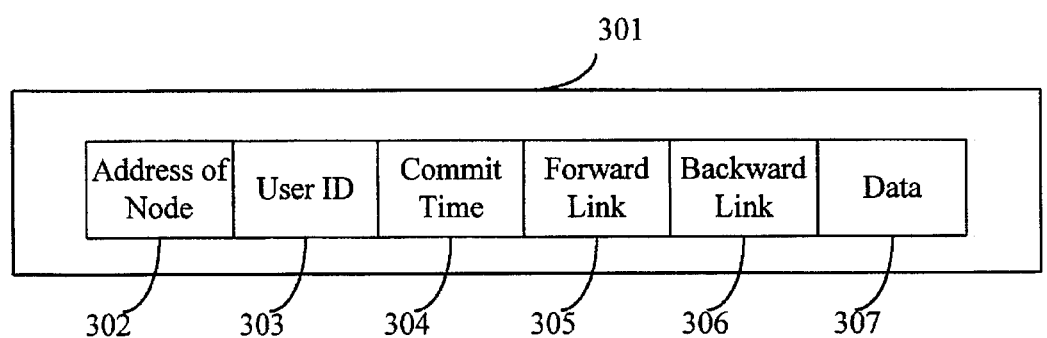
FIG. 3 is a block diagram of an entry in the version store of FIG. 1, the entry including an address field, a user identification field, a commit time field, a forward link field, a backward link field, and a data field in accordance with the preferred embodiment of the present invention.

FIG. 3 is a block diagram of an entry 301 in the version store 105. The entry 301 comprises an address field 302, a user identification field 303, a commit time field 304, a forward link field 305, a backward link field 306, and a data field 307. The address field 302 contains the location of a corresponding record in the database 106. Preferably, the location of any record is represented by a page identifier and an offset to indicate the location of the record on the page. The user identification field 303 indicates which user caused the version to be created. The commit time field 304 indicates when the entry was committed. A user may undo or roll back an entry at any point in time before commit time. The forward link field 305 and the backward link field 306 contain pointers to other entries (i.e. versions) for the same record. The forward link field 305 contains a pointer to the next older entry (according to commit time) and the backward link field 306 contains a pointer to the next youngest entry (according to commit time). This linked list of entries in the version store 105 is referred to as a version chain. The data field 306 contains a copy of the record before begin time of the modification transaction.

Figure 4:
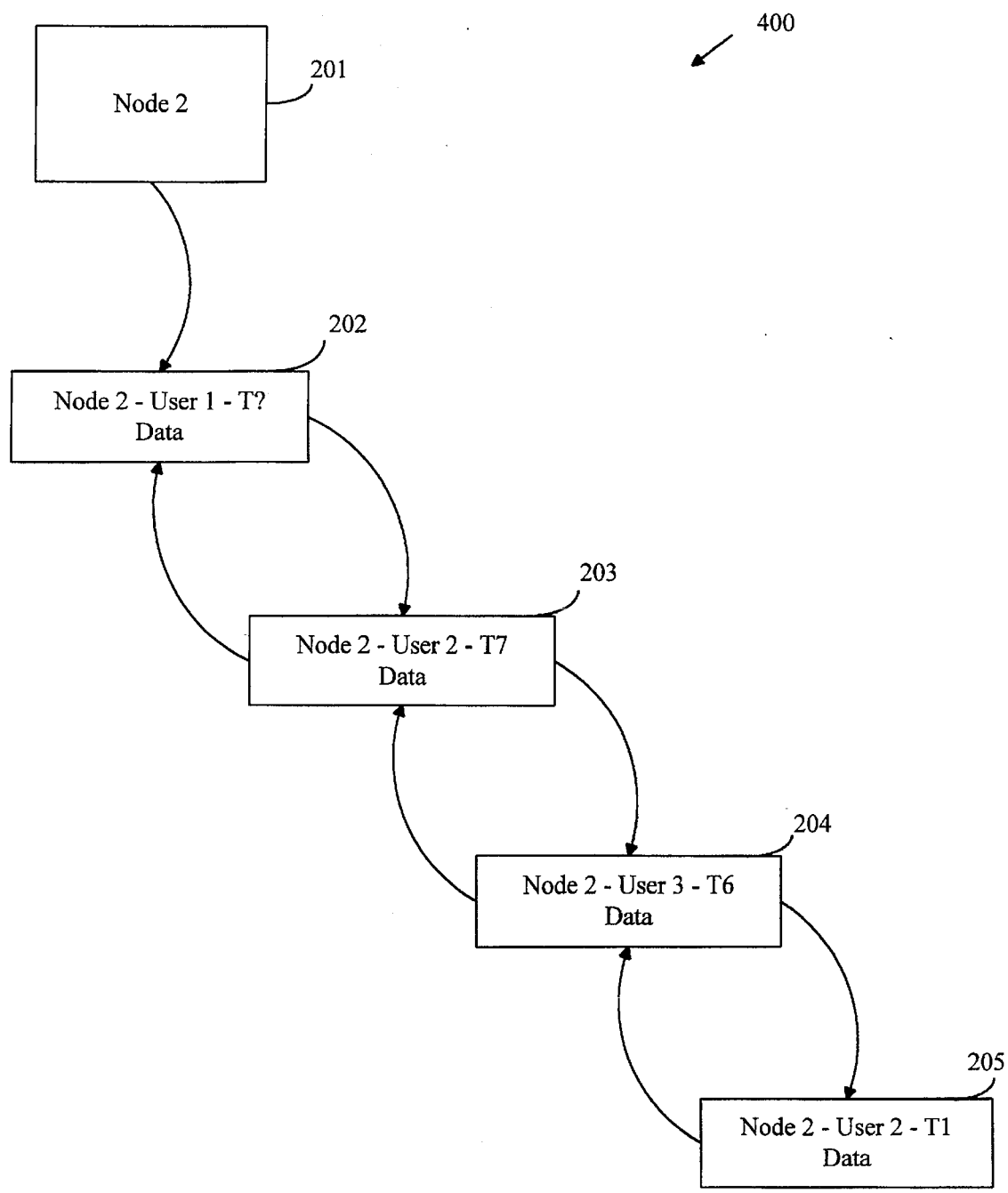
FIG. 4 is a block diagram of a version chain, including a node and multiple versions in accordance with the preferred embodiment of the present invention.

FIG. 4 is a block diagram of a version chain 400, including the node 201 and the versions 202, 203, 204, and 205. As described with reference to FIG. 2, the node 201 is stored in the database 106 in the secondary memory 103, while the versions 202, 203, 204, and 205 are entries in the version store 105 stores in the main memory 101. Version 202 was created by "USER 1" and is uncommitted (designated in FIG. 4 as "T?"); version 203 was created by "user 2" and was committed at time "T7"; version 204 was created by "USER 3" and was committed at time "T6"; version 205 was created by "USER 2" and was committed at time "T1". The versions 202, 203, 204, 205 are ordered within the version chain 400 by their commit time. Because version 202 is uncommitted, it is treated as the youngest version in the version chain.

Figure 5:
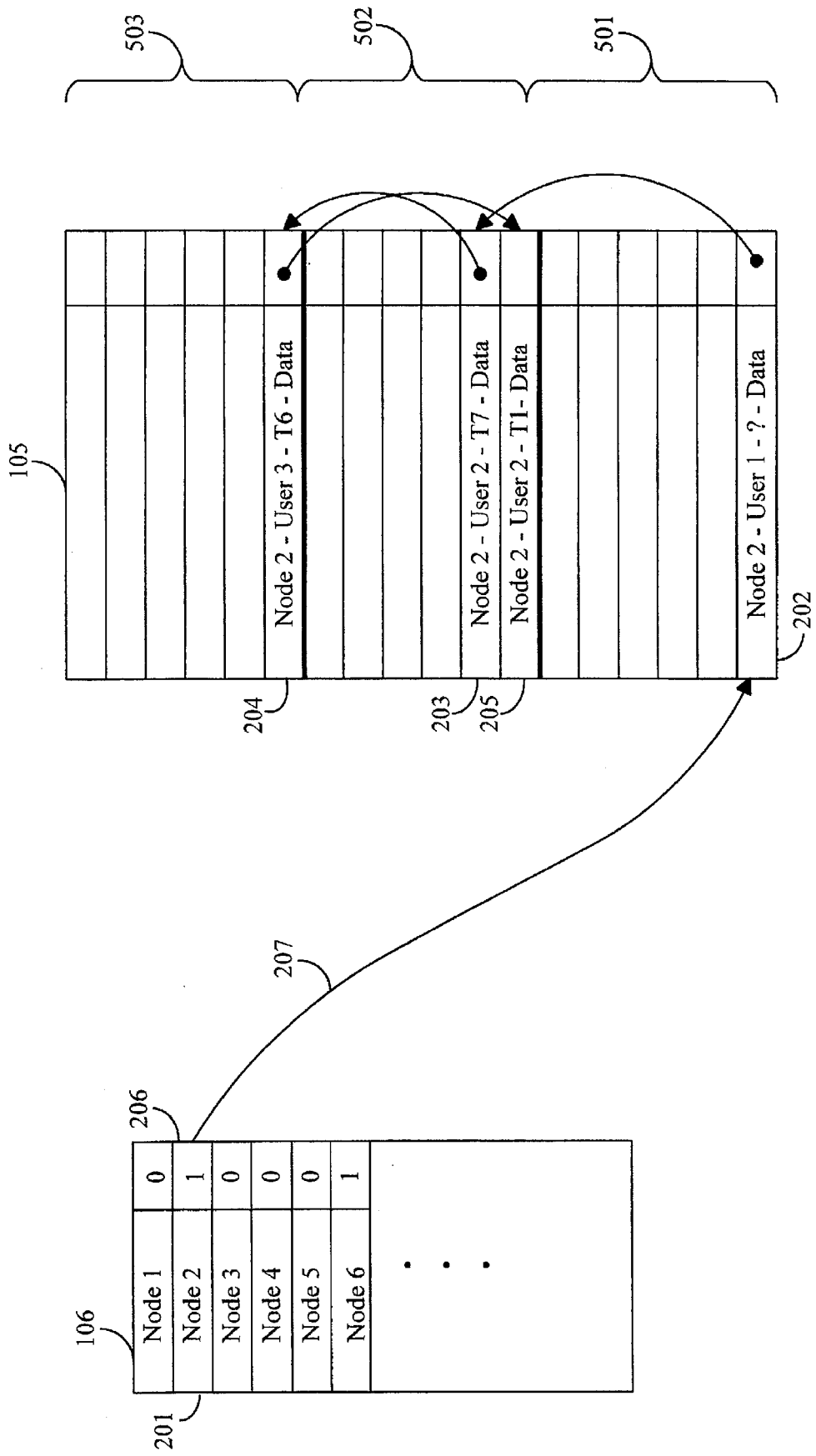
FIG. 5 is a block diagram of the database and the version store of FIG. 1, the version store being logically divided into a plurality of buckets in accordance with the preferred embodiment of the present invention.

In the preferred embodiment of the present invention, version chains for different nodes are stored in the version store 105 on a per user basis. FIG. 5 is a block diagram of the database 106 and the version store 105, the version store 105 being logically divided into a plurality of buckets 501, 502, and 503. In the preferred embodiment, a bucket is a contiguous set of pages (e.g., four pages, or 16 KB). A bucket logically corresponds to a segment in 286 architecture, and may be implemented as such. Although some operating systems may treat pages of a bucket individually, for purposes of this detailed description, a bucket is a unit which is either all in memory or all paged out. One skilled in the art will appreciate that a bucket may consist of any number of pages.

In FIG. 5, three buckets are shown for illustrative purposes only. The amount of buckets are restricted only by the amount of available main memory and the number of users accessing the database 106. The version indicator 206 stored in the node 201 contains a value of "1" to indicate that versions of node 201 may exist in the version store 105. Version 202, created by USER 1, is stored in the bucket 501 allocated to USER 1. Versions 203 and 205, created by USER 2, are stored in the bucket 502 allocated to USER 2. Version 204, created by USER 3, is stored in he bucket 503 allocated to USER 3.

Figure 6:
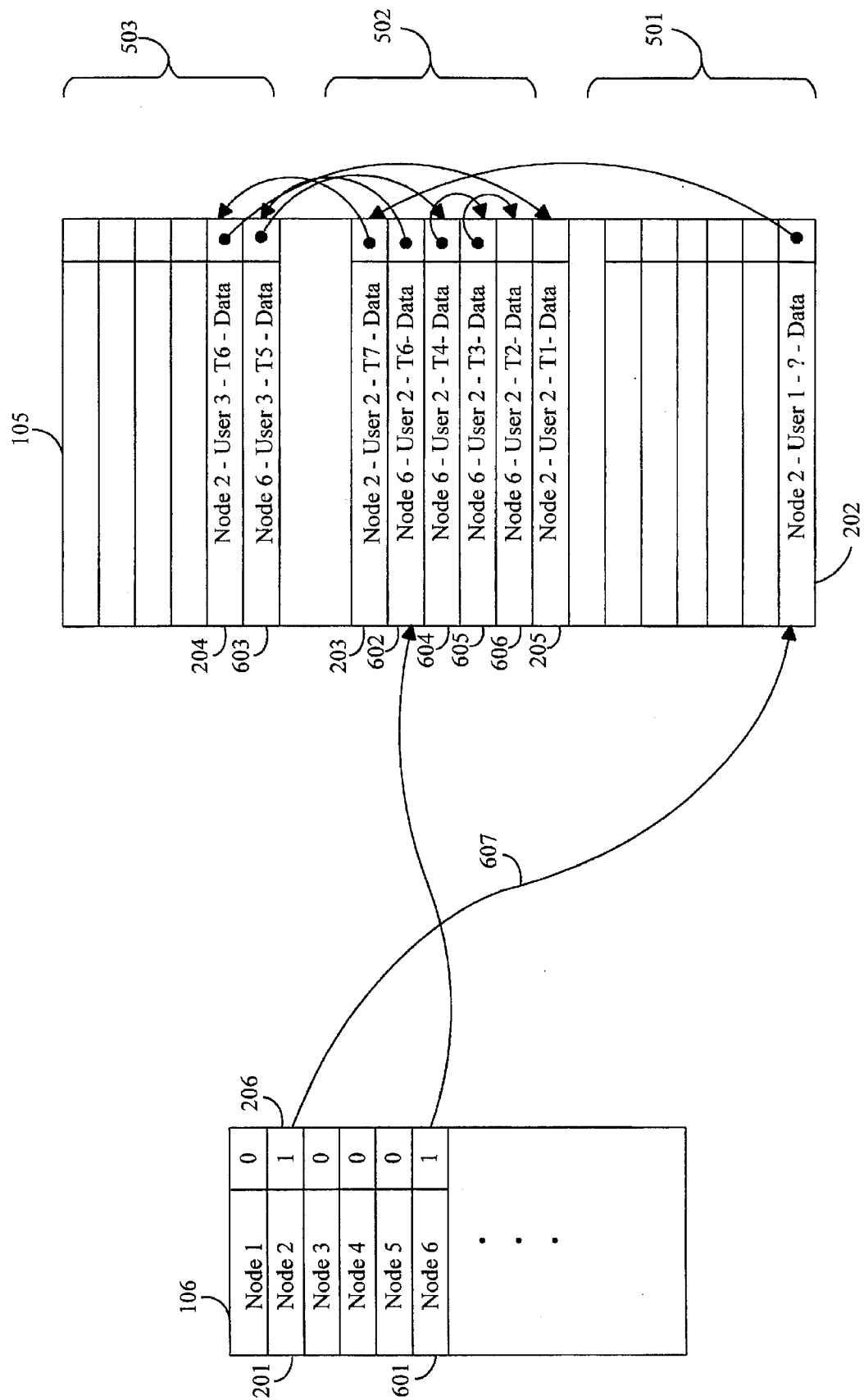
FIG. 6 is a block diagram of the database and the version store of FIG. 1, the database including two nodes and the version store being logically divided into a plurality of buckets and including a version chain for each of the two nodes in accordance with the preferred embodiment of the present invention.

When versions exist for multiple nodes, the versions are stored in the appropriate bucket as they are created. FIG. 6 is a block diagram of the database 106 including nodes 201 and 601, and the version store 105 including version chains for the nodes 206 and 601. The version chain for node 601 includes versions 602, 603, 604, 605, and 606. Version 602 was created by "USER 2" and was committed at time "T6"; version 603 was created by "USER 3" and was committed at time "T5"; version 604 was created by "USER 2" and was committed at time "T4"; version 605 was created by "USER 2" and was committed at time "T3"; version 606 was created by "USER 2" and was committed at time "T2". Note that the versions are ordered in each bucket based upon the commit time of the version, with the oldest version being stored at the bottom of the bucket and the youngest version being stored at the top.

The preferred embodiment manages space within a bucket as a combination of a stack and a linear queue. Versions are always added to the top of the bucket like a stack. Space may be freed from the top of the bucket like in a stack or from the bottom of the bucket like in a queue. Occasionally, free space may develop in the middle of a bucket, but only free space at the top of a bucket is ever reused. When a bucket has no more free space, a new bucket is allocated for the user and added to the top of the bucket chain. Entirely empty buckets are released from the bucket chain to the free bucket chain.

Versions created by a user are kept together in one or more buckets. Versions for different concurrent users are kept in different buckets. This enables entire buckets to be freed for old committed transactions and maintain a degree of locality of reference. A version is created whenever a record is modified for the first time in a transaction. Space for the version is allocated from the top of a user's current bucket and the version is formatted and added to the version chain for the record.

Storing versions in the version store 105 in the main memory 101 may potentially take up a considerable amount of space. Keeping this in mind, it is desirable to keep processing overhead for version management to a minimum. The preferred embodiment uses the underlying operating system's normal paging strategy and memory mapping hardware to manage the version store.

Figure 7:
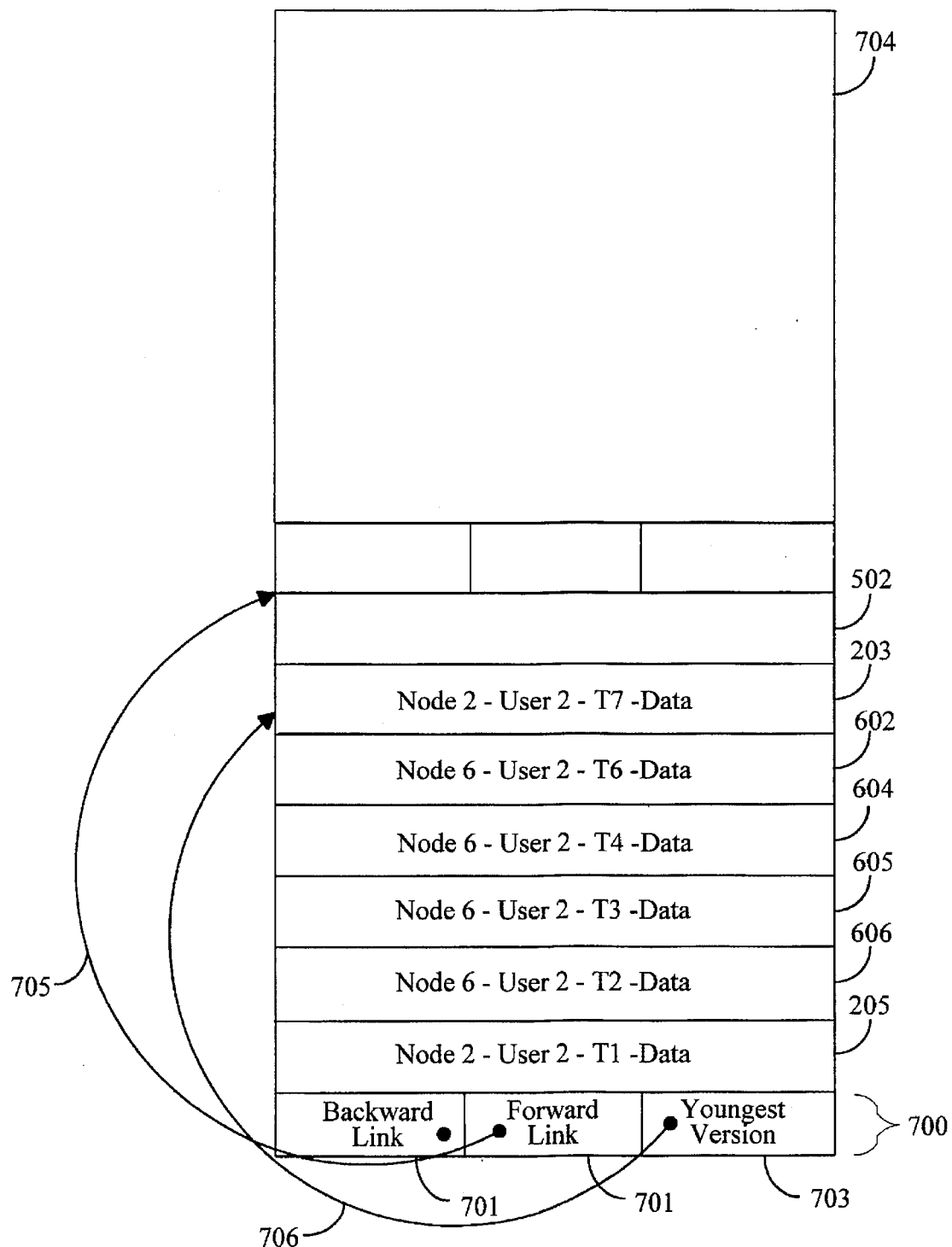
FIG. 7 is a block diagram of one of the buckets of FIG. 6 in accordance with the preferred embodiment of the present invention.

FIG. 7 is a block diagram of bucket 502 allocated to USER 2 in accordance with the preferred embodiment of the present invention. In addition to versions 203,205, 602, 604, 605, and 606, the bucket 502 contains a header area 700. The header area 700 contains a backward link area 701, a forward link area 702, and a youngest version area 703. The backward link area 701 contains a pointer to a previous bucket allocated to USER 2. For purposes of this example, the bucket 502 is the first bucket assigned to USER 2, therefore the backward link area 701 contains a null value. The forward link area 702 contains a pointer 705 to another bucket 704. The bucket 704 is shown with dashed lines because it has not yet been allocated. The youngest version area 703 contains a pointer 706 to the youngest version stored in the bucket 502. In this example, version 203 with a commit time of "T7" is the youngest version stored in bucket 502.

Initially, all buckets may be linked together in a "free bucket" list. A bucket is taken from the free bucket list and assigned to a user as individual buckets are filled with versions. The number of buckets in the free bucket list may be specified as a system initialization parameter.

In the preferred embodiment, two methods exits for searching the version store 105. The version store may be searched by the bookmark of a node, or by the user identifier of the user who modified the node. A bookmark in this context is some sort of location indicator. In the preferred embodiment of the present invention, a bookmark consists of five bytes: one byte to store a database location, three bytes to store a page location within the database, and one byte to store a node location within the page. To facilitate searching by the bookmark, the preferred embodiment utilizes a hash table containing pointers to the youngest version in each version chain. To facilitate searching by the user identifier, the preferred embodiment utilizes a user identification table containing pointers to the beginning of a bucket chain for each user.

Figure 8:
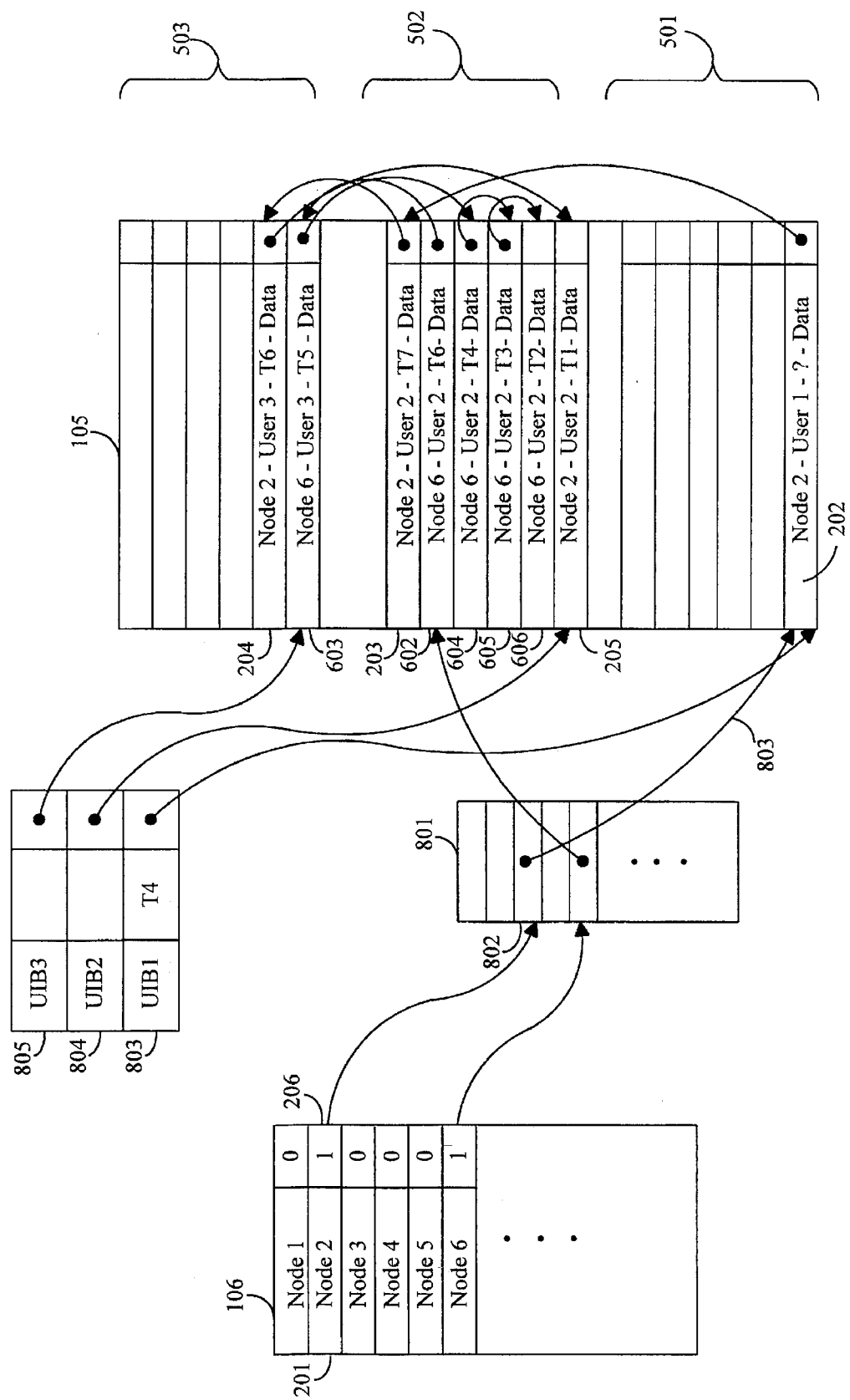
FIG. 8 is a block diagram of a hash table and a user identification table, in addition to the database and version store as shown in FIG. 6.

FIG. 8 is a block diagram of a hash table 801 and a user identification table 802, in addition to the database 106 and version store 105 as shown in FIG. 6. As mentioned previously, each node in the database 106 contains a version indicator to indicate whether the versions may exist for a node. In the preferred embodiment, the version indicator is not an absolute indicator as to whether versions may exist, rather, it only indicates the possibility of versions. When the version indicator indicates that a record may have versions, an entry in the hash table 801 corresponding to the record is accessed.

To access an entry in the hash table 801, the low order byte of a node's page identifier is XORed to the offset of the node in the page. This hash algorithm is used because using the page offset itself as an index to the hash table makes poor use of randomization as most pages contain relatively few records. Conversely, using the page identifier for hashing is not efficient for routines which require access to many records on the same page. Note that different records from the same page always appear in different version chains.

The user information table 802 contains three user information blocks 803, 804, and 805. Each of these user information blocks contain a begin time for the oldest uncommitted transaction for a user, and a pointer to the first bucket in the user's bucket chain. For example, the user information block 803 contains a begin time "T4" and a pointer to the bucket 501 assigned to USER 1.

Referring to FIG. 8, the node 201 in the database 106 contains a version indicator 206. Because the version indicator 206 is set to "1", the bookmark for the record 201 is hashed to access the entry 802 in the hash table 801. The entry 802 in the hash table 801 contains a pointer 803 to the youngest version 202 for the node 201. Because the youngest version 202 was created by USER 2, the version 202 is stored in the bucket 501 allocated to USER 2. The version 202 contains a pointer to a next older version 203, which contains a pointer to a next older version 204, which in turn contains a pointer to an oldest version 205.

The data structures shown in FIGS. 2–8 are used by the database server 104 (FIG. 1) to determine whether a user is permitted to modify a record and to determine which version of a record a read-only transaction should use.

Figure 9:
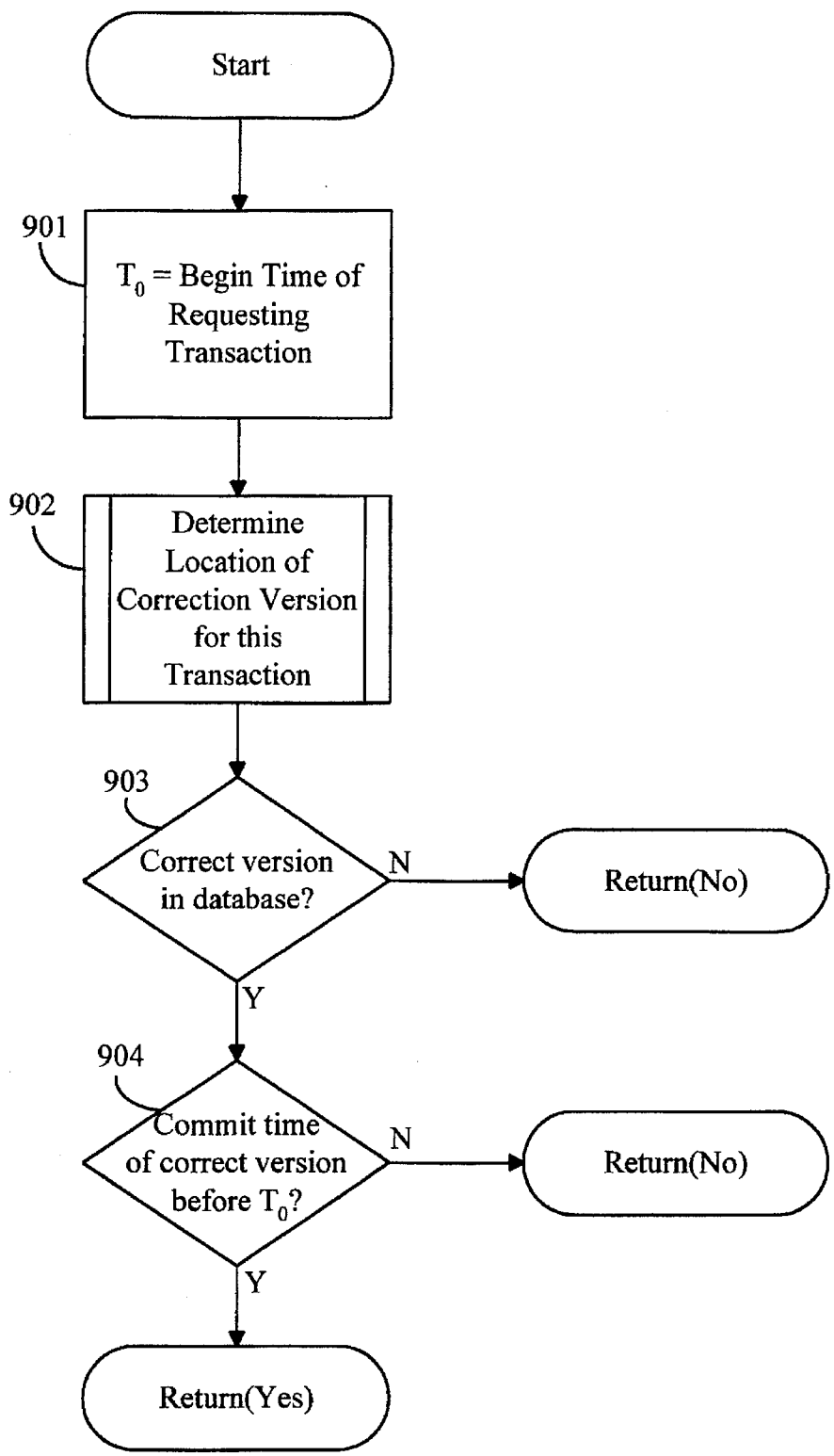
FIG. 9 is a flow diagram of a method used in the preferred embodiment of the present invention to determine whether a user is permitted to modify a particular record in the database.

FIG. 9 is a flow diagram of a method used in the preferred embodiment of the present invention to determine whether a user may modify a particular record in the database. A user may modify a record only if the "correct version" of the record is currently stored in the database. In step 901 a variable $T_0$ is set equal to the begin time of the user's modification transaction. Note that the begin time of the modification transaction is when the entire transaction begins, not merely when a particular record is accessed. For a transaction that accesses many different records, the begin time is the same for each access. In step 902, the database server determines the location (i.e., in the database or in the version store) of the correct version for the user attempting to modify the record. The correct version depends upon the identity of the user and the commit time of the version. The method used in the preferred embodiment to determine the location of the correct version is explained in detail below with reference to FIGS. 10A and 10B.

If the correct version is not stored in the database (step 903), then the database server determines that the requesting user may not edit the record. If the correct version is stored in the database (step 903), then the database server determines in step 904 whether the commit time of the correct version is before $T_0$, the begin time of the modification transaction. If the correct version is stored in the database (step 903), and the commit time of the correct version is before $T_0$ (step 904), then the database server determines that the requesting user may edit the record. If the correct version is stored in the database (step 903), but the commit time of the correct version is after $T_0$ (step 904), then the database server determines that the requesting user may not edit the record.

Figure 10A:
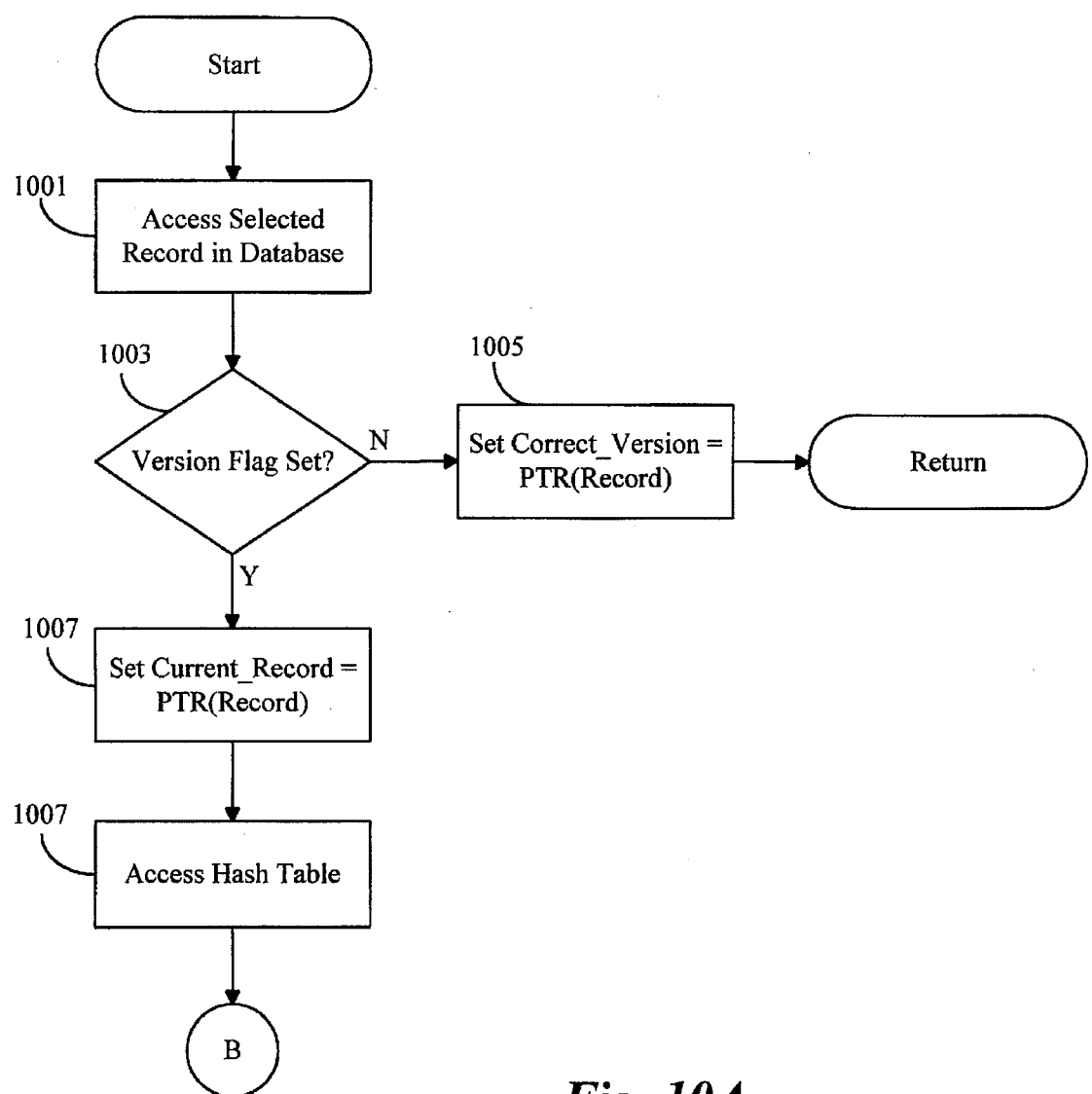
FIGS. 10A–10B comprise a detailed flow diagram of the method used in the preferred embodiment to access the correct version of a selected record.
Figure 10B:
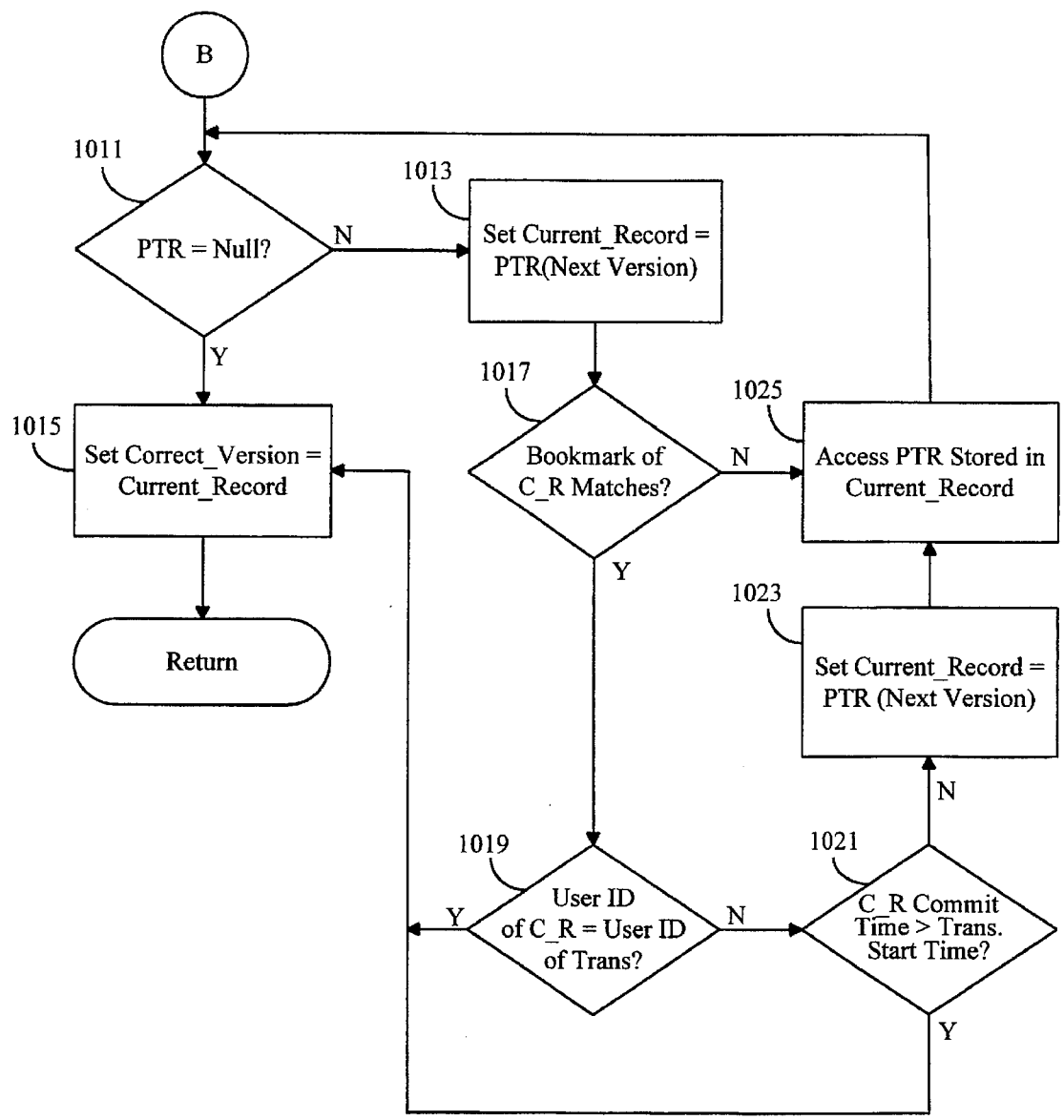

FIGS. 10A-10B comprise a detailed flow diagram of the method used in the preferred embodiment to access the correct version of a selected record. In step 1001 the database server accesses the selected record in the database. In step 1003, the database server determines whether the version indicator stored in the selected record indicates that the selected record may have one or more versions. In the preferred embodiment, the version indicator is a bit that is set to 1 to indicate versions may exist, and is set to 0 to indicate that versions do not exist. If the database server determines in step 1003 that the selected record does not have any versions, then in step 1005 the database server sets a variable CORRECT_VERSION equal to the database record. The variable CORRECT_VERSION may contain a pointer to the record stored in the database, or it may contain some indication that the correct version of the record is stored in the database.

If the database server determines in step 1003 that versions may exist for the selected record, then in step 1007 the database server sets a variable CURRENT_RECORD equal to the database record. Similar to the variable CORRECT_VERSION, the variable CURRENT_RECORD may contain a pointer or some indicator to keep track of which record/version in the version chain is currently being examined. In step 1009 the database server accesses an entry in the hash table corresponding to the selected record. If the accessed entry in the hash table contains a null pointer (step 1011 in FIG. 10B), then in step 1015 the database server sets the variable CORRECT_VERSION equal to the value stored in the variable CURRENT_RECORD.

If the database server determines that the accessed entry in the hash table contains something other than a null pointer (step 1011), then in step 1013, the database server follows the pointer stored in the accessed entry to a version stored in the version store. This version is known as "CURRENT_RECORD" (or "C_R"). The version pointed to by the pointer stored in the hash table is the youngest version corresponding to the selected record. Because of the hashing scheme used, multiple records may hash to the same version. In step 1017, the database server determines whether the bookmark of version pointed to by CURRENT_RECORD is equivalent to the bookmark of the selected record. If the bookmark of the version pointed to by CURRENT_RECORD is not the same as the bookmark of the selected record, then in step 1025 the database server follows the forward pointer stored in the version pointed to by CURRENT_RECORD to the next oldest version in the version chain. Steps 1011, 1013, 1017, and 1025 are repeated until either the end of the version chain is found, or a version is located that has the same bookmark as the selected record.

If the bookmark of the accessed version is the same as the bookmark of the selected record in the database, then in step 1019 the database server determines whether the user ID of the access version is equivalent to the user ID of the requesting user. If the user ID of the accessed version is the same as the user ID of the requesting user, then in step 1015 the database server sets the variable correct version equal to the value of the variable current record. If the database server determines that the user ID of the accessed version is not equivalent to the user ID of the requesting user (step 1019), then in step 1021 the database server determines whether the commit time of the accessed version is greater than the begin time of the modification transaction. This begin time was previously defined as $T_0$. If the database server determines that the commit time of the accessed version is greater than $T_0$, then in step 1015 the database server sets the variable correct version equal to the value of the variable current record. If the database server determines that the commit time of the accessed version is less than $T_0$, then in step 1023 the database server sets the variable current record equal to the accessed version. In step 1025 the database server examines the forward link stored in the accessed version. The process loops back to step 1011.

Figure 11A:
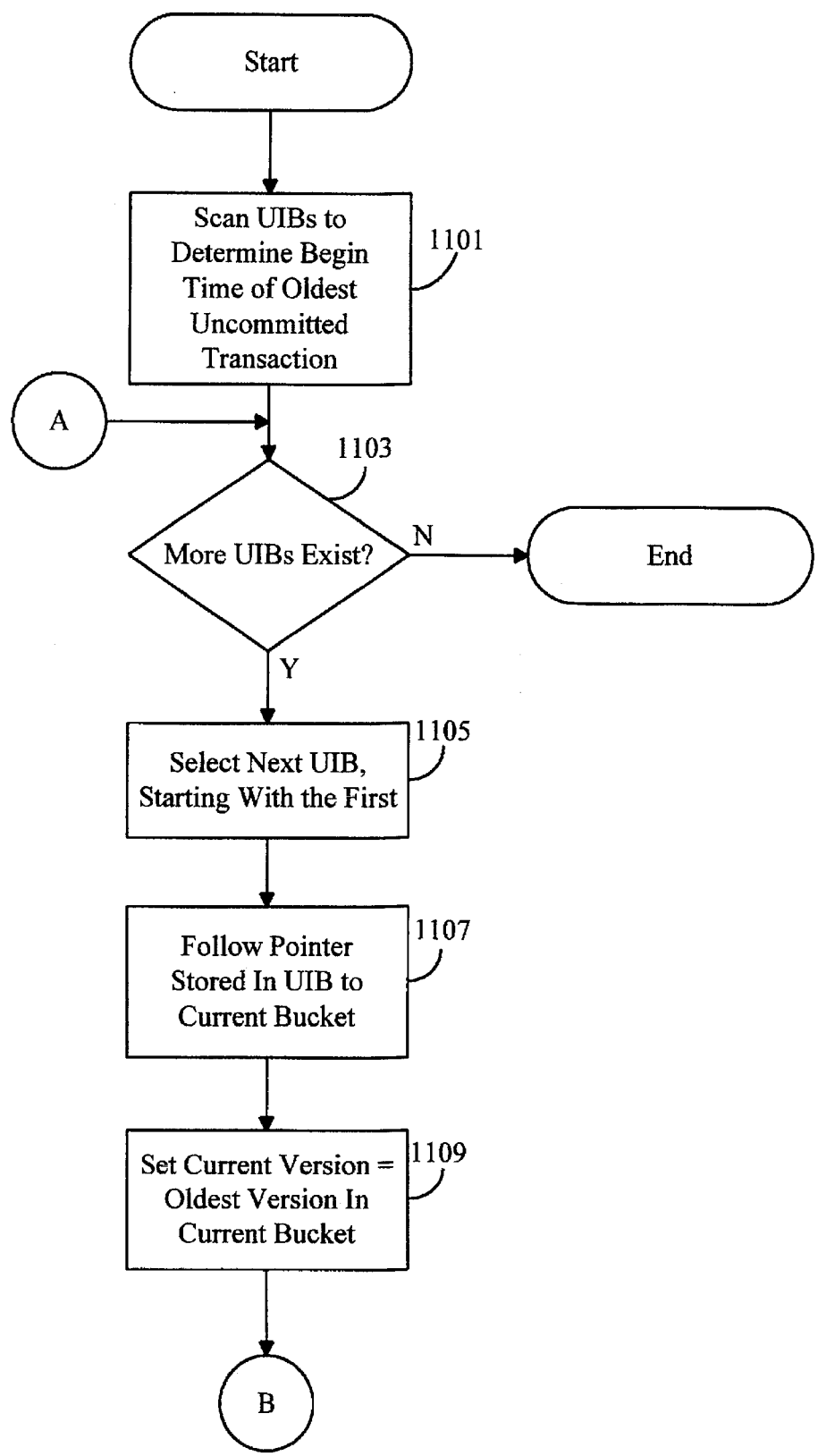
FIGS. 11A–11B comprise a detailed flow diagram of the method used in the preferred embodiment to remove unnecessary versions and buckets stored in the version store of FIG. 1.
Figure 11B:
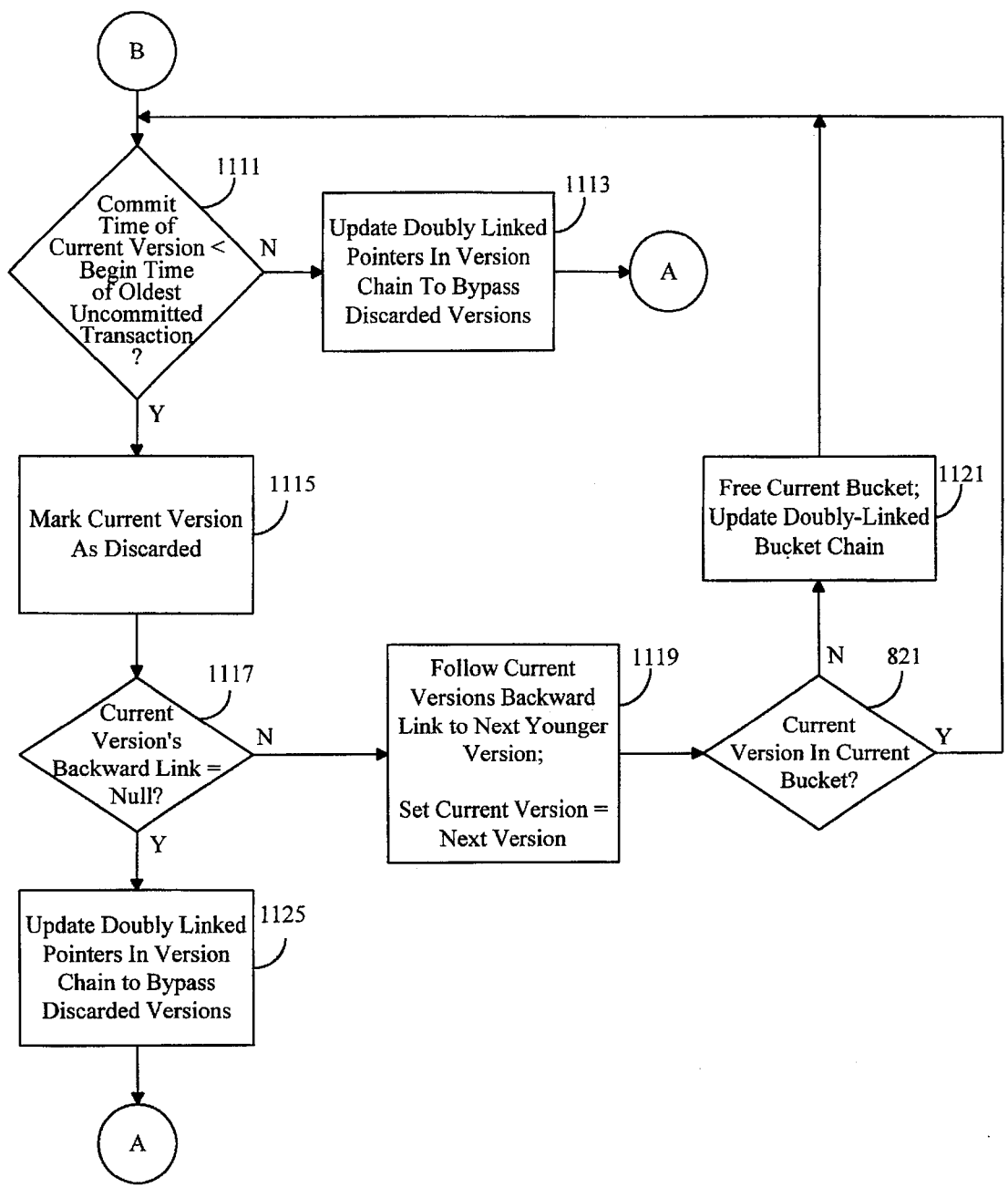

FIGS. 11A-11B comprise a detailed flow diagram of the method used in the preferred embodiment to "clean-up" unnecessary versions and buckets stored in the version store. In step 1101 the database server scans the user information table to determine the begin time of the oldest uncommitted transaction stored in the version store. The general idea of the clean-up process is to discard any versions that have a commit time that is before the begin time of the oldest uncommitted transaction for any user. Any versions having a commit time before the begin time of the oldest uncommitted transaction no longer need to be stored in the version store. The user information blocks stored in the user information table are accessed one by one and versions are discarded on a per user basis.

In step 1103 the clean-up routine determines whether any user information blocks need to be examined. If all user information blocks have previously been examined, then the clean-up routine ends. If all user information blocks stored in the user information area have not been examined, then in step 1105 the clean-up routine selects the next user information block, starting with the first user information block.

In step 1107, the clean-up routine follows the pointer stored in the selected user information block to a bucket designated as the current bucket. In step 1109, the clean-up routine sets a variable (current version) equal to the oldest version in the current bucket. The oldest version in the current bucket is stored in the "bottom" of the current bucket. Continuing on to step 1111 in FIG. 11B, the clean-up routine determines whether the commit time of the current version is less than the begin time of the oldest uncommitted transaction. If the commit time of the current version is less than the begin time of the oldest uncommitted transaction, then in step 1115 the clean-up routine marks the current version as discarded. In step 1117, the clean-up routine determines whether the current version's backward link contains a null pointer. If the clean-up routine determines that the current version's backward link contains a null pointer, then in step 1125 the clean-up routine updates the doubly linked pointers in the version chain to bypass versions marked as discarded.

If the clean-up routine determines that the current version's backward link does not contain a null value (step 1117), then in step 1119 the clean-up routine follows the current version's backward link to the next version in the version chain, and sets the variable current version equal to the next version. In step 1121 the clean-up routine determines whether the current version is stored in the current bucket. If the current version is not stored in the current bucket, then in step 1123 the clean-up routine marks the current bucket as discarded and updates the doubly linked pointers in the bucket chain. Steps 1111 through 1123 are repeated until either the commit time of a version is found to be less than the begin time of the oldest uncommitted transaction or the end of the version chain is reached.

Although the methods and systems of the present invention have been described in terms of a preferred embodiment, it is not intended that the innovation be limited to this embodiment. Modifications within the spirit of the invention will be apparent to those skilled in the art. The scope of the present invention is defined only by the claims that follow.

I claim:

1. A method in a computer system for storing versions of a record in storage space wherein the record is accessible to a plurality of users, said computer system including a secondary memory, the method comprising the steps of:
   a) for each of the plurality of users, allocating a fixed amount of storage space in the secondary memory;
   b) in response to an update of the record by a first user, storing a first version of the record in the portion of the storage space allocated to the first user, the first version comprising a copy of the record before the record was updated by the first user; and
   c) in response to a subsequent update of the record by a second user, storing a second version of the record in the portion of storage space allocated to the second user, the second version comprising a copy of the record after the record was updated by the first user and before the record was updated by the second user.

2. A method in a computer system for storing versions of a record in storage space wherein the record is accessible to a plurality of users, the method comprising the steps of:
   a) for each of the plurality of users, allocating a fixed amount of storage space;
   b) in response to an update of the record by a first user, storing a first version of the record in the portion of the storage space allocated to the first user, the first version comprising a copy of the record before the record was updated by the first user; and
   c) in response to a subsequent update of the record by a second user, storing a second version of the record in the portion of storage space allocated to the second user, the second version comprising a copy of the record after the record was updated by the first user and before the record was updated by the second user.

3. In a computer system having a main memory and a secondary memory, a method for determining whether a user is permitted to edit a record stored in the secondary memory, the method comprising the steps of:
   a) providing a version store that is stored in one of the memories, the version store logically subdivided into a plurality of buckets, each bucket storing versions of the record for a particular user, each version containing a copy of the record prior to an edit and a commit time indicating when the edit was committed;
   b) in response to an edit request for the record from the user at a time $T_0$, locating a most recent copy of the record, the most recent copy being either the record stored in secondary storage or one of the versions stored in the version store;
   c) when the most recent copy of the record is one of the versions stored in the version store, determining that the user is not permitted to edit the record;
   d) when the most recent version of the record is the record stored in the secondary memory, determining whether the commit time of the most recent copy is before the time $T_0$;
   e) when the commit time of the record stored in the secondary memory is before the time $T_0$, determining that the user is permitted to edit the record; and
   f) when the commit time of the record stored in the secondary memory is after the time $T_0$, determining that the user is not permitted to edit the record.

4. The method of claim 3 wherein the step of locating a most recent copy of the record includes the steps of:
   determining whether versions of the record are stored within the version store;
   when it is determined that versions of the record are not stored within the version store, determining that the record stored in the secondary memory is the most recent copy of the record;
   when it is determined that versions of the record are stored within the version store, determining which version is the most recent copy of the record; and
   accessing the version determined to be the most recent copy of the record.

5. The method of claim 4 wherein the step of determining which version is the most recent copy of the record includes the steps of:
   providing a linked list storage unit within the version store, the linked list storage unit storing the versions such that the versions are ordered such that the position of the version within the version chain is determined by commit time;
   traversing the versions stored within the linked list storage unit until a version is located whose commit time is after the time $T_0$;
   when a version is located whose commit time is after the time $T_0$, selecting that version as the most recent copy of the record; and
   traversing the ordered list of versions until a version is located whose user identifier is equivalent to the requesting user identifier.

6. A computer system for managing records stored in a secondary memory of the computer system, the computer system having a main memory and the records being accessible to a plurality of users, comprising:
   a version store stored in one of the memories for storing versions of the records, the version store logically subdivided into a plurality of storage blocks such that one storage block is allocated for each of the plurality of users so that versions for a user are stored together in the storage block allocated to the user; and
   a database server for determining in response to an access request for one of the records by a selected one of the plurality of users whether the selected user should have access to the record as stored in the secondary memory or to a version of the record as stored in the version store.

7. The computer system of claim 6 further comprising a main memory for storing the version store.

8. The computer system of claim 6 wherein the version store comprises a linked list structure that spans the plurality of storage blocks and wherein all versions of a record are stored in the linked list structure.

9. The computer system of claim 6 wherein each record stored in the secondary memory comprises data and a version indicator for indicating whether versions of the record are stored in the version store.

* * * * *